Apr. 3, 1923.
C. A. NELSON
1,450,862
HEADLIGHT ATTACHMENT
Filed Mar. 23, 1922
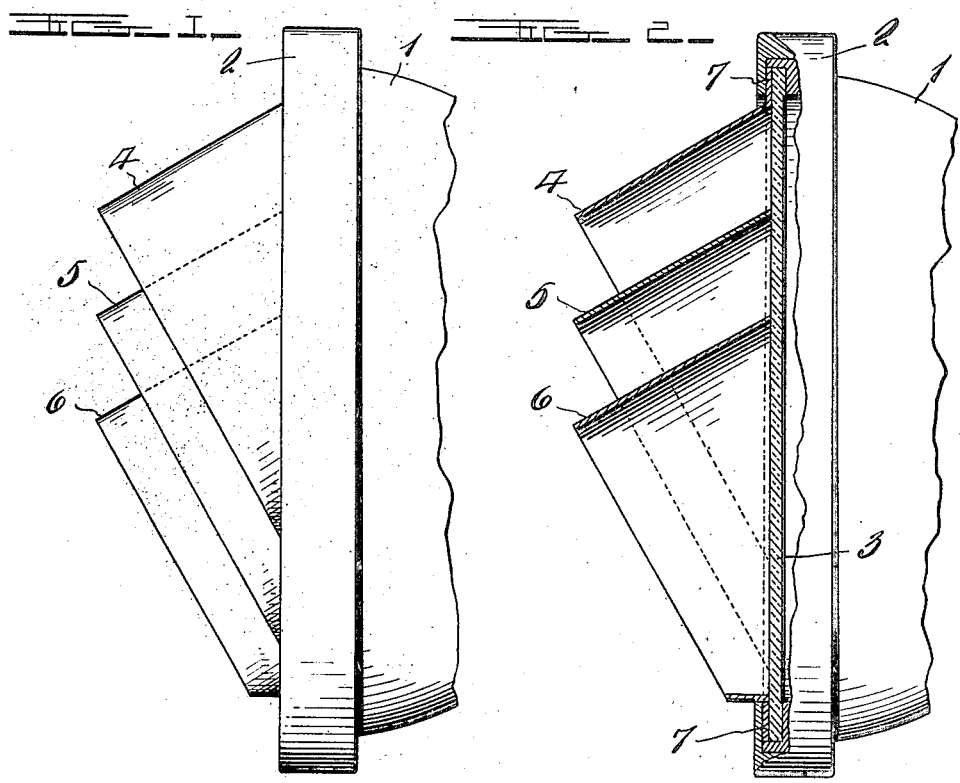
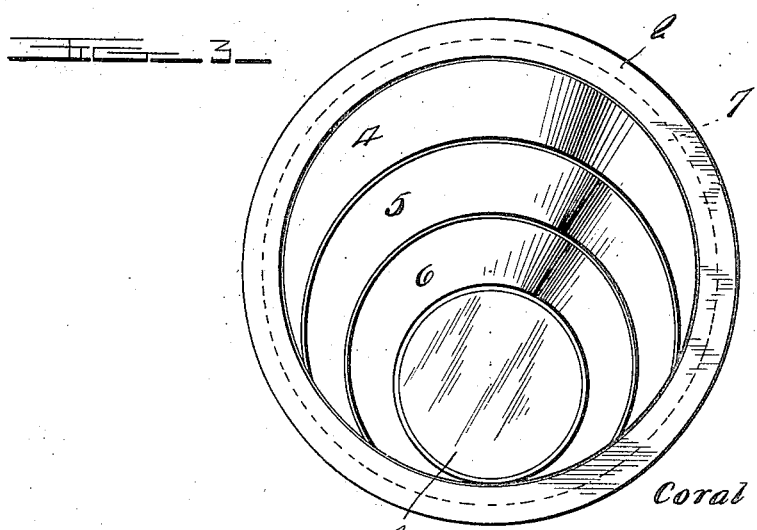
Inventor
Coral A. Nelson
By William C. Linton.
Attorney Patented Apr. 3, 1923.

1,450,862

UNITED STATES PATENT OFFICE.

CORAL A. NELSON, OF BINGHAMTON, NEW YORK.

HEADLIGHT ATTACHMENT.

Application filed March 23, 1922. Serial No. 546,092.

*To all whom it may concern:*

Be it known that I, CORAL A. NELSON, a citizen of the United States of America, residing at Binghamton, in the county of Broome and State of New York, have invented certain new and useful Improvements in Headlight Attachments; and I do hereby declare that the following is a full, clear, concise, and exact description of the invention, such as will enable others skilled in the art to which it appertains to make and use the same.

This invention relates to headlight attachments, having for an object to provide a shade or visor attachment for the lenses of automobile headlights whereby to eliminate the annoying and menacing glare of the same and to prevent the temporary blinding of persons observing them as well as serious accidents or collisions resulting therefrom.

It is likewise an object of the invention to provide an attachment for automobile headlights which may be readily positioned adjacent to and secured in position with relation to the headlight lens in a manner to divert the projected light rays from the normal line of vision of a person forwardly of the vehicle so equipped.

Other objects will be in part obvious and in part pointed out hereinafter.

In order that the invention and its mode of operation may be readily understood by persons skilled in the art, I have in the accompanying illustrative drawings and in the detailed following description based thereon, set out one possible embodiment of the same:

In these drawings:

Figure 1 is a side elevation of the improved device;

Figure 2 is a vertical section therethrough; and,

Figure 3 is a front elevation of the same.

Having more particular reference to the drawings, in connection with which like characters of reference will designate corresponding parts throughout, 1 designates a fragment of a headlight casing or housing having the usual rim 2 arranged adjacent the open front wall thereof adapted to secure the lens 3 in a fixed or immovable position over said open front wall whereby to refract the light rays emitted from the source contained within the housing 1.

The invention may be stated to comprehend a plurality of nested relatively eccentric semi-circular visors 4, 5 and 6, it being noted upon reference to the Figure 3, that these visors are respectively arranged in superimposed fashion and are inter-connected at their lower portions, the uppermost visor 4 carrying a circular lateral flange 7 which is adapted to be positioned directly adjacent the outer side of the lens 3 and to be engaged by the outer marginal flange of the securing rim 2. In this way, the inter-connected visors, 4, 5 and 6 will be fixedly secured with relation to the lens 3 and by reason of the downwardly disposed marginal portions thereof will cause light rays emitted from the source within the housing 1 to be diverted downwardly and out of the normal line of vision of a person forwardly of a vehicle provided therewith and observing the same.

It is important to note, in this particular connection, that the innermost marginal portion of the upper side of the visor 6 is in direct horizontal alignment with the outer marginal portion of the upper side of the visor 5, while the inner marginal portion of the upper side of said visor 5 is in horizontal alignment with the upper side of the visor 4, thereby forming an effectual obstruction for preventing the outward projection of light rays from the headlight in a horizontal or substantially horizontal plane, which as will be understood, will cover the normal line of vision of a person and by consequence, create a dangerous menace because of the temporary blinding effects resulting therefrom.

Because of the equi-distant spaced relation of the visors with relation to each other, it will be understood that ways for permitting of the unobstructed downward projection of light rays from the lamp is provided, although, as heretofore noted, projection of the light rays from the headlight in a horizontal plane or substantially horizontal plane with the accompanying undesirable effects will be prevented. Because of the provision made for the projecting of the downwardly directed light rays from the headlight so equipped, ample illumination will be provided for and hence, enable a driver or operator of the vehicle to readily observe the course being traversed or to be traversed.

The visors 4, in their preferred form, are constructed of sheet metal, such as brass or the like, coated upon their outer sides with a suitable composition, such as enamel or the like, while the inner sides of the same are silver-plated or similarly finished whereby to provide a reflecting surface and thus increase the lighting efficiency of the headlight equipped.

Manifestly, the construction shown is capable of considerable modification, and such modification as is within the scope of my claim, I consider within the spirit of my invention.

I claim:

The combination with a headlight lens and its supporting frame, a supporting band secured between the front part of the supporting frame and the marginal edge portion of the lens, a headlight visor having an opening circular in front elevation, said opening being eccentric to the center of the lens and tangential to the bottom of the supporting frame, the visor inclining downwardly at its upper part, a second visor tangential to the upper part of the supporting frame and inclined downwardly with the top portion in parallelism to the first visor and its center eccentric thereto, and a third visor positioned intermediate the first two visors and inclined downwardly with its top portion in parallelism to the top portion of said visors, the third visor being arranged with its center eccentric to the other two visors.

In witness whereof I have hereunto set my hand.

CORAL A. NELSON.